(12) United States Patent
Rohde et al.

(10) Patent No.: US 6,254,063 B1
(45) Date of Patent: Jul. 3, 2001

(54) ENERGY ABSORBING BREAKAWAY STEEL GUARDRAIL POST

(75) Inventors: John R. Rohde; John D. Reid; Dean L. Sicking, all of Lincoln, NE (US)

(73) Assignee: Safety By Design, Inc., Lincoln, NE (US)

( * ) Notice: Subject to any disclaimer, the term of this patent is extended or adjusted under 35 U.S.C. 154(b) by 0 days.

(21) Appl. No.: 09/378,821

(22) Filed: Aug. 23, 1999

Related U.S. Application Data

(63) Continuation-in-part of application No. 09/187,461, filed on Nov. 4, 1998.

(51) Int. Cl.[7] ............................................. E01F 15/00
(52) U.S. Cl. ..................... 256/13.1; 256/1; 256/DIG. 5; 52/98; 403/2
(58) Field of Search ................... 403/2, 293; 256/131, 256/1, DIG. 5; 248/900, 548; 52/98, 170, 726.2, 729.2; 40/607

(56) References Cited

U.S. PATENT DOCUMENTS

| | | | |
|---|---|---|---|
| 3,820,906 | * 6/1974 | Katt | 403/2 |
| 5,160,111 | * 11/1992 | Hugron | 403/2 X |
| 5,484,217 | * 1/1996 | Carroll et al. | 403/2 |
| 6,065,894 | * 5/2000 | Wasson et al. | 403/2 |

* cited by examiner

*Primary Examiner*—Lynne H. Browne
*Assistant Examiner*—John R. Cottingham
(74) *Attorney, Agent, or Firm*—Jackson Walker L.L.P.

(57) ABSTRACT

An improved breakaway steel guardrail post for use in dissipation of impact energy upon impact of the post having an upper post member and a lower post member, a connecting joint, and a mechanism connected to the upper and lower post members for controlling the energy dissipation of the guardrail post about the connecting joint at a predetermined rate. A first embodiment utilizes a cable restraint lopped through openings in the guardrail posts. Other embodiments included straps and fasteners designed to distort or fail at predetermined rates or strengths and combinations thereof.

12 Claims, 6 Drawing Sheets

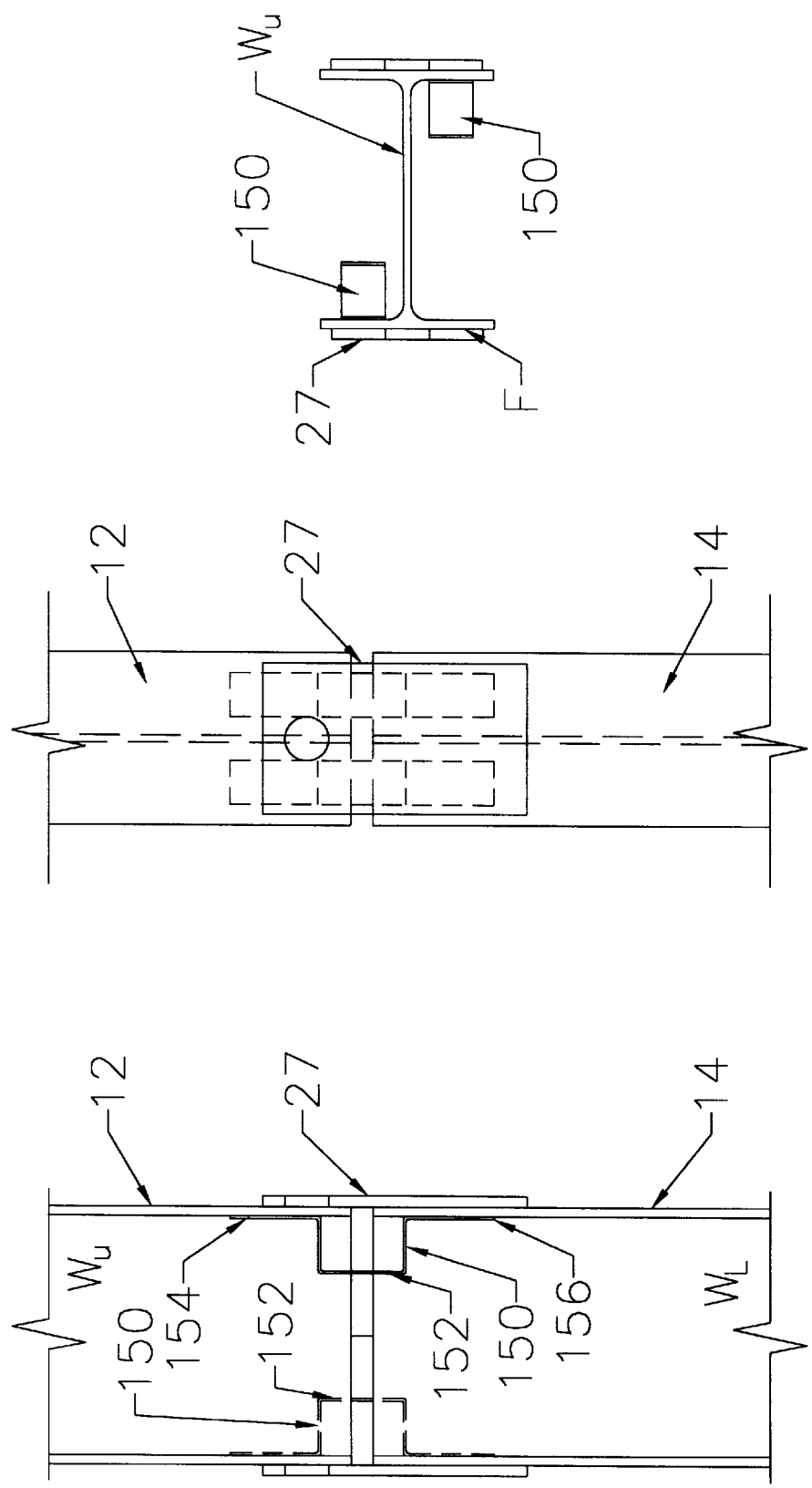

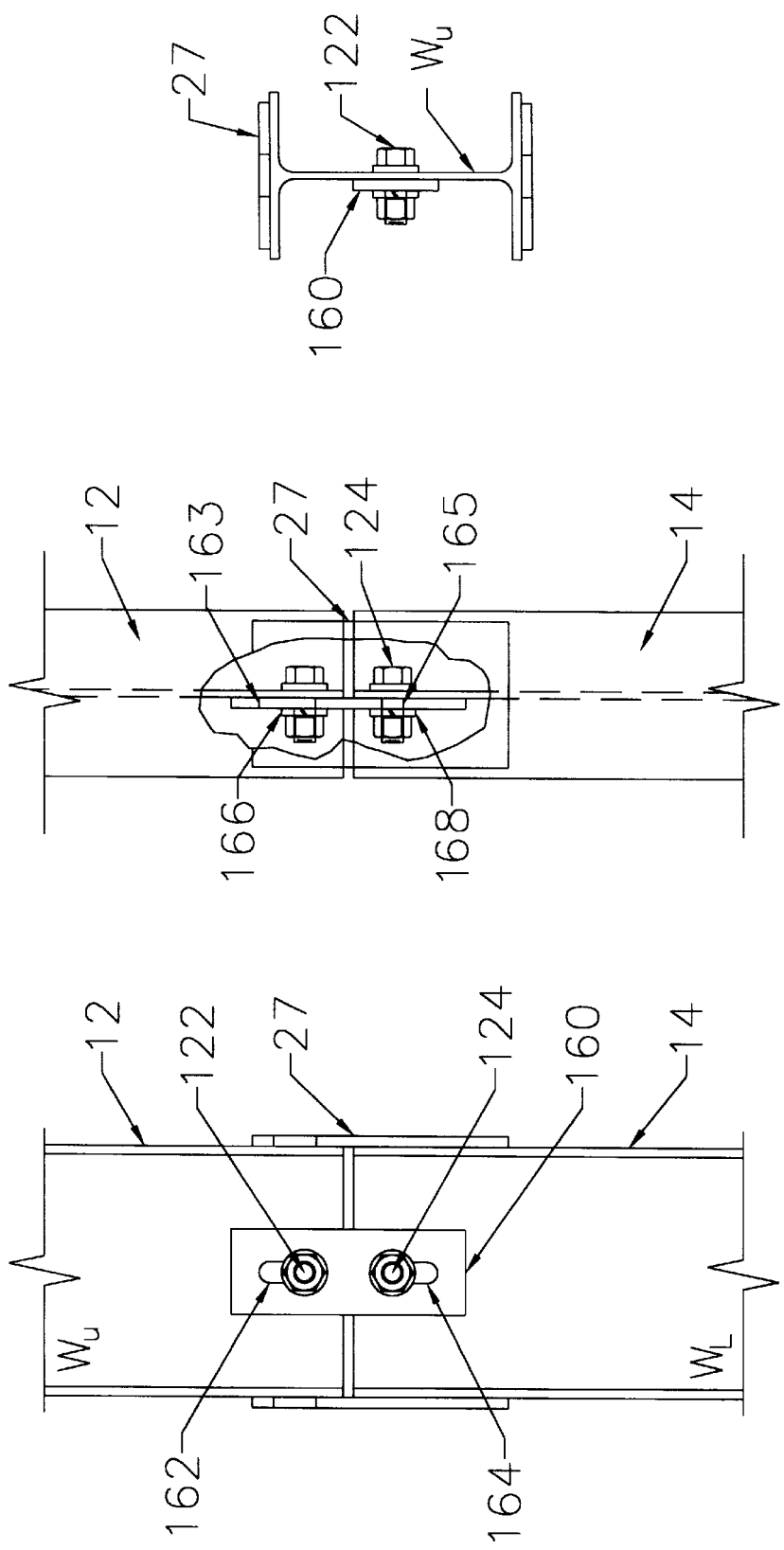

ENERGY ABSORBING BREAKAWAY STEEL GUARDRAIL POST

This is a continuation-in-part application of co-pending U.S. patent application Ser. No. 09/187,461, filed Nov. 4, 1998, which is incorporated herein by reference for all purposes.

BACKGROUND OF THE INVENTION

The present invention relates to breakaway steel posts for use with a highway guardrail end terminal system or a crash attenuation system. More particularly, the invention relates to a supplemental energy-absorbing mechanism affixed to such steel posts.

Existing highway guardrail end treatment systems include: the breakaway cable terminal (BCT), the eccentric loader terminal (ELT), the modified eccentric loader terminal (MELT), the vehicle attenuating terminal (VAT), the extruder terminal (ET), the slotted rail terminal (SRT), the sequential kinking terminal (SKT), and the flared energy absorbing terminal (FLEAT).

In all of these systems, breakaway wooden posts, either inserted in foundation tubes (known as BCT breakaway post) or directly installed in the ground (known as controlled release terminal CRT post), are used to facilitate proper breaking of the posts to minimize the potential for snagging on the posts and excessive decelerations on the vehicles in end-on impacts with the terminals. Holes are drilled into the wooden post at and/or below ground level to reduce the cross-sectional area of the post, thus reducing the force required to break the post. Steel breakaway posts based on the slip-base concept have also been developed, but did not receive widespread acceptance due to maintenance problems and higher initial costs.

However, there are situations in which a transportation agency may choose not to use wooden posts for environmental concerns or as a matter of policy. In such situations, breakaway steel post would be an alternative. A prior patent of the inventors relates to various conceptual designs for breakaway posts suitable for use with highway guardrail and end terminal systems. These designs have a predictable breakaway force threshold when impacted along the weak axis (in the direction of end-on impacts with the terminal system) while maintaining a sufficiently high bending force in the strong axis (perpendicular to the weak axis in the direction of side impacts) to provide the required lateral stiffness to the terminal system for side impacts.

The present invention relates to an improved steel post for use with a highway post-and-beam type guardrail at locations where deflection of the post in the soil is limited or not allowed, e.g., posts embedded in concrete or asphalt in such applications as mow strips.

Existing standard guardrail line posts, either wood or steel, require some deflection in the soil to function properly. When a guardrail is impacted, the posts in the immediate vicinity of the impact would typically deflect and absorb some of the impact energy. Deflection of the posts would allow the rail to go into tension and act like a ribbon to contain and redirect the vehicle. If deflection of the posts in the soil is not allowed or limited in such applications as mow strips where the posts are embedded in concrete or asphalt, wooden posts would fracture and steel posts would bend or twist at the base.

The present invention relates to various conceptual designs for energy-absorbing breakaway steel guardrail posts suitable for use at locations where deflection of the post in the soil is limited or not allowed. These designs provide a predictable failure or yielding force threshold when impacted to maintain the required lateral stiffness; a mechanism for adequate energy dissipation by the post; and a limit beyond which the lateral resistance of the post is eliminated.

SUMMARY OF THE INVENTION

The improved breakaway guardrail post of the present invention includes upper and lower post sections which are connected by a specially designed breakaway joint. The guardrail may be provided with a various number of alternative embodiments of controllers attached to the upper post member and lower post member to control the energy dissipation of the guardrail about the breakaway joint at a predetermined rate. The failure or yield is at a predictable force threshold when impacted along either the strong or weak axis while maintaining a sufficiently high bending force in the strong axis to provide the required lateral stiffness to the terminal system for side or strong axis impacts.

The present invention discloses several energy-absorbing controller alternatives for breakaway posts used with a highway guardrail or crash attenuation system. All breakaway alternatives involve joining of two sections (upper and lower) of structural steel shape (e.g., I-beam) posts in such a manner that the joint will fail or yield at a predictable force threshold when impacted along the weak axis while maintaining a sufficiently high bending force in the strong axis to provide the required lateral stiffness to the terminal system for side impacts. The lower section of the post is installed in the ground by either means of driving or drill and backfill. The rail element for the guardrail or crash attenuation system is attached to the upper portion of the post. The energy absorbing dissipation controlling mechanisms include: a cable restraint member; a strap attached along the post web; a strap having a U-shaped portion; and straps with slotted openings for receiving fasteners.

BRIEF DESCRIPTION OF THE DRAWINGS

FIG. 3 shows a front elevation view of yet another embodiment of the control member of the present invention having a U-shaped strap.

FIG. 3A shows a side elevation view of the embodiment of FIG. 3.

FIG. 3B is a top view of the embodiment of FIG. 3.

FIG. 4 illustrates a front view from the weak axis direction of a third embodiment of the present invention having a strap with two slotted openings.

FIG. 4A shows a side elevation view of the strap embodiment of the present invention having a single slotted opening.

FIG. 4B shows a top view of the embodiment of FIG. 4A.

DETAILED DESCRIPTION OF THE PREFERRED EMBODIMENT

Figure 1:
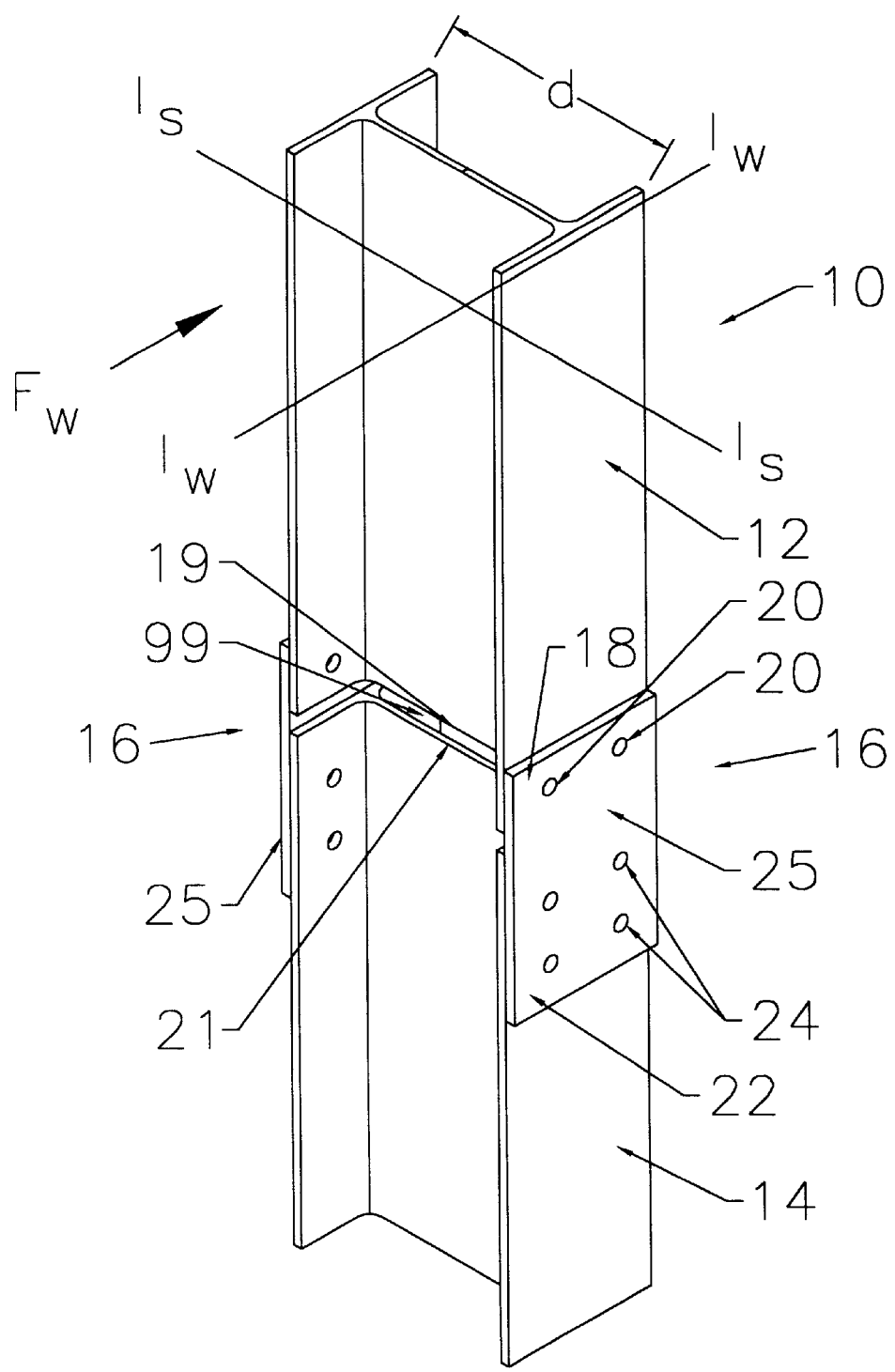
FIG. 1 illustrates a perspective view of a steel breakaway guardrail post without a supplemental energy-absorbing mechanism of the present invention.

Turning to the drawings, it may be seen in FIG. 1 that a breakaway post 10 has an upper post member 12 and a lower post member 14. They are joined by connecting joint 16. (It should be understood that any of the embodiments of co-pending application Ser. No. 09/187,461 may be utilized to form the connecting joint 16.) The upper end 18 of joint 16 is attached to post member 12 by a first set of fasteners 20 while the lower end 22 of the joint 16 is attached to the lower post 14 by a second set of fasteners 24. As may be seen the ends 19 and 21 of upper post 12 and lower post 14 are slightly spaced apart when the posts are joined by joint 16 yielding a slight gap 99 between the ends 19 and 21.

Figure 1C:
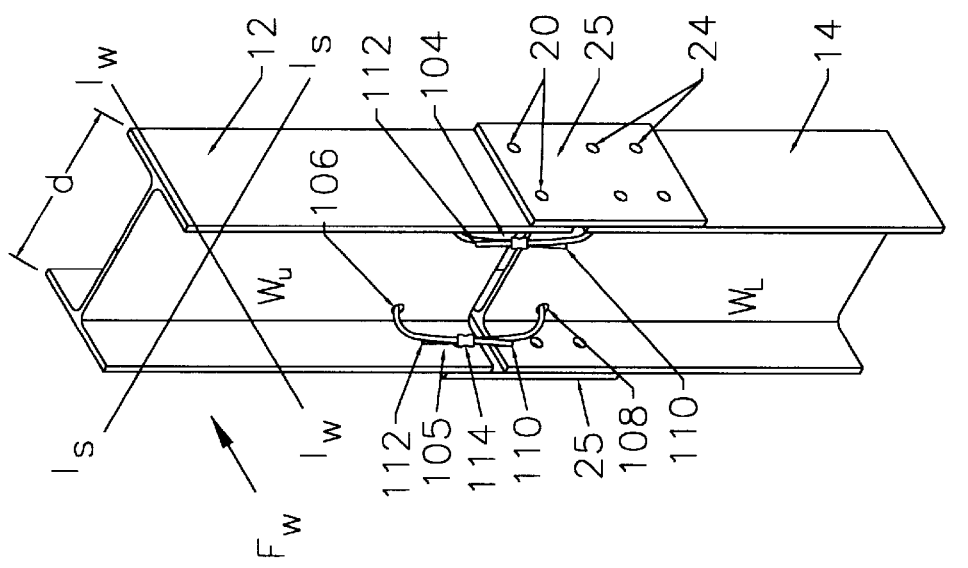
FIG. 1C a perspective view of the present invention with two cable restraint members.
Figure 1B:
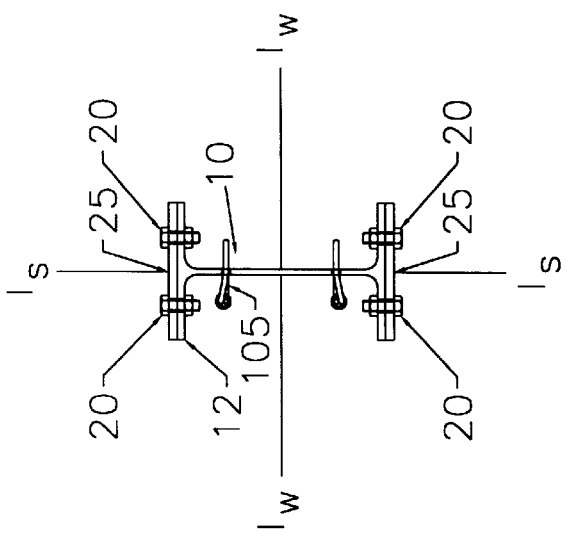
FIG. 1B a top view of the present invention illustrating the cable restraint mechanism.
Figure 1A:
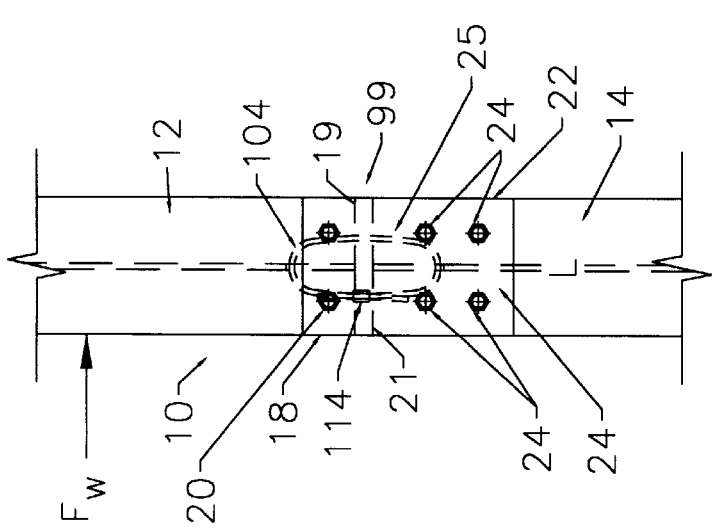
FIG. 1A shows a side elevation view of a cable restraint embodiment of the present invention.
Figure 1D:
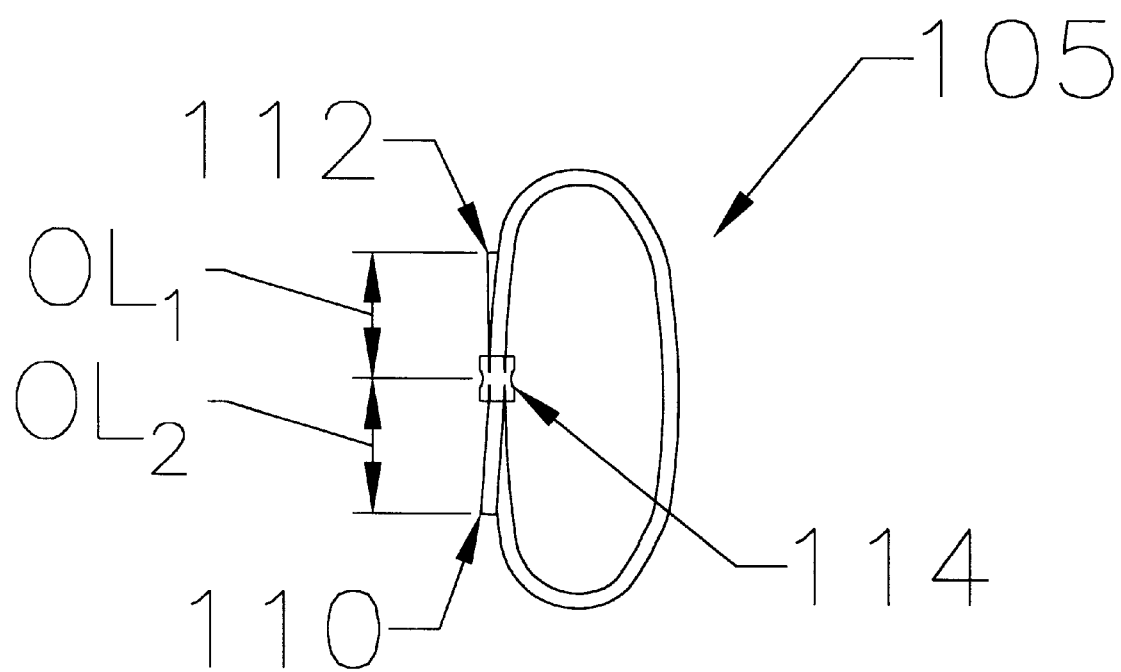
FIG. 1D shows a looped cable restraint of the present invention.

In FIGS. 1 and 1A, joint 16 is formed by steel plates 25 on opposite sides of the post 10. The lower post member 14 is rigidly attached to the plates 25 by four or more bolts 24 (or welding) on each side (flange) of the post 14. While FIG. 1B illustrates the post 10 as constructed from steel I-beam, other material compositions and composites may be used.

The upper post member 12 is attached to the plates 25 by two through bolts 20. Other connectors such as pins, rods, welds and the like may be used.

As shown in the embodiment of FIGS. 1–1C, when impact forces are applied in the weak axis direction $I_w$, one of the two through bolts 20 breaks and the upper post 12 rotates downwardly. The fracture force in the weak direction is:

$$F_w = \frac{2aV_{2/3}}{h}$$

where, $F_w$ = static force required to fail one through bolt about the weak axis.

$a$ = distance between the through bolts.

$h$ = height of $F_w$ above the through bolts.

$V_b$ = shear strength of through bolts.

The force required to fail the connection in the strong direction is then $$F_{3/8} = \frac{2dV_{2/3}}{h}$$

when $F_s$ = static force required to fail through bolts when loaded about strong axis.

d = post depth (shown in FIG. 1).

The ratio between these two failure forces $R_f$ is shown below. Thus, the post strengths in each direction can be controlled by selecting the bolt size to control $V_b$ and the appropriate ratio d/a.

$$R_{7/8} = \frac{d}{a}$$

Thus, the connecting joint member or plate 25 is connected to upper post 12 at the upper end 18 by first fasteners 20 to lower post 14 with the lower end 22 attached by a second fastener 24. The first fasteners have a failure strength less than the failure strength of the second fasteners. When the impact face strikes the upper post member 12 along the direction of the weak axis $I_w$, one of the first fasteners 20 fails and the upper post 12 rotates downwardly about the other of the first fasteners.

The improvement of the present invention is shown in FIGS. 1A–1C as a cable restraint 104 or plurality of such restraints 104 and 105. FIG. 1C shows the cables 104 and 105, made of materials having well known strength characteristics, passing upper opening 106 in web $W_u$ and lower opening 108 in web $W_L$. The cables each are of a predetermined length L and have first ends 110 and second ends 112. The ends overlay or overlap each other by predetermined lengths $OL_1$ and $OL_2$, and joined or held together by a cable clamp 114 having a predetermined slip strength (see FIG. 1 D). The cable ends pull through the clamp at a predictable force level, providing rotational resistance or deflection for the post.

The clamp 114 is crimped after the cable is slipped through the openings 106 and 108 and overlapped by lengths $OL_1$ and $OL_2$. The length of the free ends 110 and 112 of the cable on either side of the clamp controls the distance (or rotation of the post) through which resistance acts. As the post is loaded, the breakaway mechanism on the flange fails and the cable resists rotation (acting like the post rotating in soil and absorbing energy).

Energy dissipation during the cable slipping process is the magnitude of the slip force times the available slip distance. The force required to cause a cable to slip through the clamp is related to the size and type of the cable involved and the number, size, and type of clamping devices used in the joint. The optimum slip force is determined using static testing of various cable types and sizes with different clamping mechanisms. Common methods for clamping two cable ends together include threaded cable clamps or ferrules made from different metals such as copper or aluminum. Threaded clamps have a U shape with two nuts that force a cross piece down onto the cables in the clamp. Ferrules are generally formed in "figure 8" shape with one cable through each of two openings. Ferrules are attached to the cables using a crimping device that deforms the metal around the two cables. Slip forces in these two connections are controlled by the size and number of threaded clamps or the amount of crimping on the ferrule.

The available slip distance in the cable splice is the total amount of cable extending beyond the clamp. When forces are applied to such a joint, one cable will usually begin to slip out of the joint before the other. When the end of the first cable approaches the clamping device the force required to pull it through the joint begins to increase due to normal damage done to the cable when it is cut. This increase in force will generally cause the other cable to begin to slip through the joint until maximum extension is achieved. Thereafter, one end of the cable will slip out of the joint and the energy dissipation process is terminated. This behavior is generally independent of the mechanism used to cut the cable. Shearing or sawing cuts cause the end of the cable to expand and torch cuts generate small clumps of metal. In either situation, the slip force increases as the end of the cable approaches the clamp, thereby causing the other cable to begin to slip and allowing the splice to reach maximum extension.

The total energy dissipated in each joint is found by experimentally measuring the slip force and multiplying by the total cable beyond the clamping mechanism.

Figures 2, 2A:
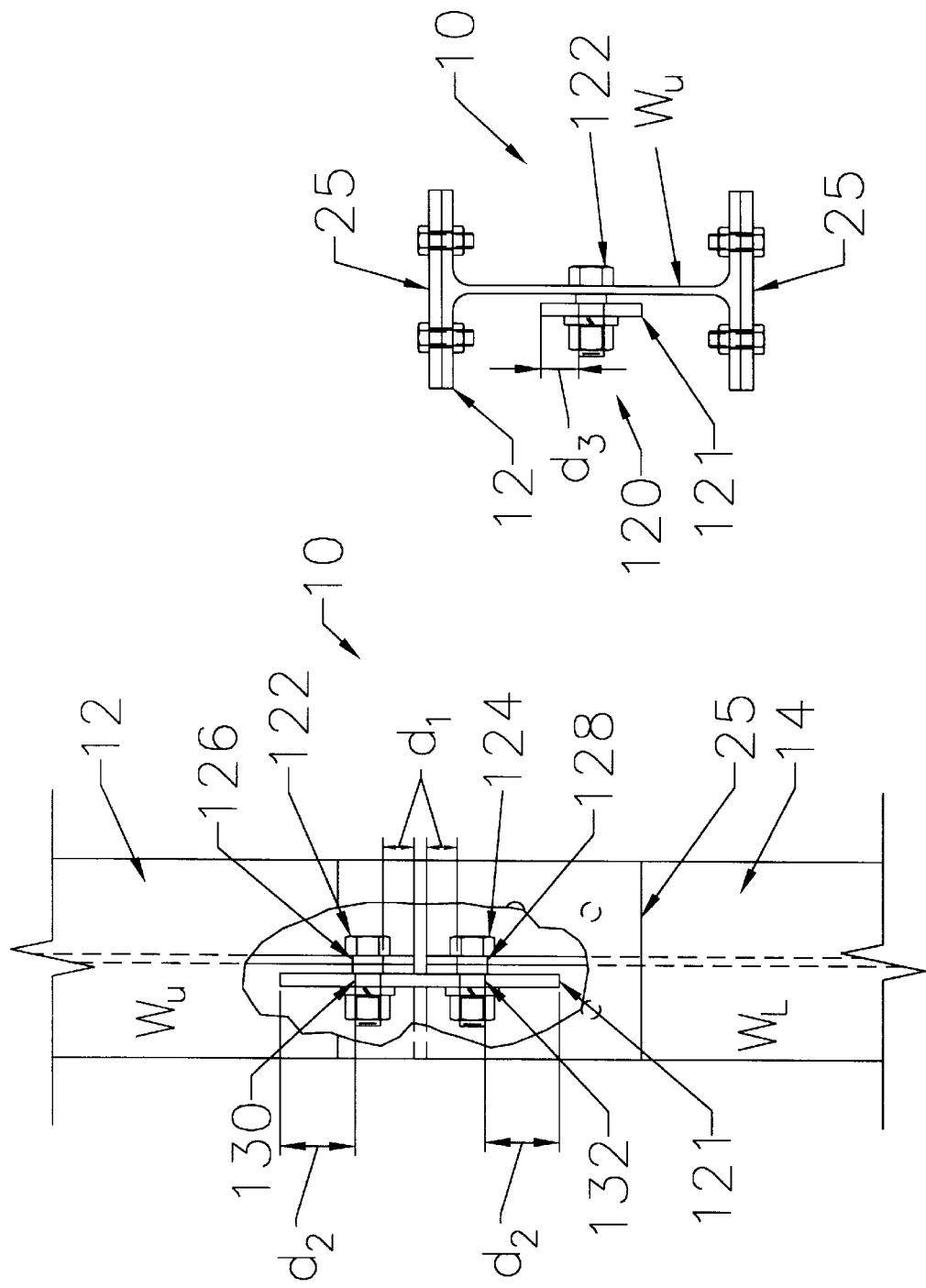
FIG. 2 illustrates a partial cutaway, side elevation view of an alternative embodiment of the control member the present invention having a strap.
FIG. 2A is a top view of the strap embodiment of the present invention.

In a second embodiment 120 of the deflection control mechanism shown in FIGS. 2 and 2A, a strap 121 is fastened to the web $W_u$ of the upper post member 12 by a first fastener 122 and to the web $W_L$ of the lower post 14 by a second fastener 124. The fasteners shown in FIGS. 2 and 2A are bolt, nut, and washer combinations but any number of fasteners such as a pin, rivet, or rod will serve the equivalent purpose. The fasteners 122 and 124 pass through openings 126 and 128 in webs $W_u$ and $W_L$ and openings 130 and 132 in the straps, respectively.

When the post 10 is loaded, and the primary mechanism 25 on the flanges fails, additional energy in this embodiment is absorbed by the failure of either the web $W_u$ or $W_L$ or the strap 121 that is connected to both top and bottom of the post members. The fasteners 122 and 124 are put into shear from the travel of the adjacent ends of the post. Failure can occur in the strap, web or bolt. In each case this is a shear failure which is a function of material properties and geometry. For the fasteners 122 and 124, the shear would occur based on strength and cross-sectional area. For the web $W_a$ and $W_L$, and strap 121, shear is determined by strength, thickness and distance $d_1$, $d_2$ and $d_3$ of the openings 126 and 128 from the edge of each respective post member or strap. It is predetermined which component will fail based on these parameters. The failure of the flat stock will simply appear as the bolt pulling past its original hole, with a failure of the material parallel to the direction of travel of the bolt.

The tear-through process will provide lateral resistance at a relatively constant force as the bolt is pulled through the metal. When the bolt breaks free of the metal, the lateral resistance of the post will be eliminated.

It should be understood that a plurality of such straps and fasteners may be attached to the guardrail post.

Yet another embodiment of the present invention is shown in FIGS. 3, 3A and 3B. Again, a strap 150 having a U-shaped portion 152 is attached at a first end 154 to the upper post member 12 and attached at a second end 156 to the lower post member 14. As shown in FIGS. 3–3B, the attachment may be made to the flange F of the post member. However, it should be understood that the strap 150 could be attached to the webs $W_u$ and $W_L$. Attachment may be by any conventional means such as welding or bolting.

Upon impact and after failure of the assembly 27 on the face of the flange F, the U-shape portion 152 will have to deform and eventually become generally straight. The force required to accomplish this is again related to the thickness and width of the strap 150, as well as its yield properties. When the strap 150 becomes generally straight, either it will fail in tension or the weld attachment will fail. Energy is absorbed over some fixed rotation and then the post fails.

FIGS. 4, 4A, and 4B illustrate still yet another embodiment of the present invention. The strap/shear concept is taken one step further by having additional travel for the fasteners 122 and 124 in slots 162 and 164. The initial deformation of the post after failure of the breakaway mechanism 27 is controlled by the friction between the strap 160 and washers 166 and 168 and the webs $W_u$ and $W_L$ of the beam. This frictional force is dependent on material properties of the respective surfaces and the torque on the fasteners 122 and 124. When the fasteners reach the end of the slots either the bolt 122 or 124, web $W_u$, or $W_L$, or strap 160, will fail in the same manner as previously discussed.

FIG. 4A illustrates an embodiment wherein a single upper slot 163 is used while the lower opening 165 for the fastener 124 is a standard sized hole for the fastener. It should be understood that a plurality of such straps with single or double slotted openings may be used on any given guardrail post.

Finally, while the description and drawings show each embodiment separately attached to a guardrail post it should be further understood that any combination of the embodiments may be arranged on a particular guardrail to yield the desired energy absorption upon guardrail impact.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. An improved breakaway steel guardrail post for use in dissipation of impact energy upon impact of said post, said post having an upper post member and a lower post member disposed beneath and spaced apart form said upper post member, and a first connecting joint member attached to said upper and lower post members, said breakaway post comprising:

a means connected to said upper post member and said lower post member for controlling said energy dissipation of said post about said connecting joint member at a predetermined rate, said controlling means further comprises a cable restraint member looped through openings in said guardrail post, said predetermined deflection rate controlled by the failure strength of said cable restraint member.

2. The improved breakaway steel guardrail post of claim 1 wherein said cable restraint member further comprises a cable of a predetermined length having a first end and a second end, said ends overlaying each other by a predetermined length and joined by a fastener of a predetermined slip strength.

3. The improved breakaway steel guardrail post of claim 1 wherein said cable passes through web portions of upper and said lower post members of said guardrail rail.

4. The improved breakaway steel guardrail post of claim 1 wherein said controlling means further comprises a plurality of said cable restraint members looped through openings in said guardrail post.

5. The improved breakaway steel guardrail post of claim 2 wherein said controlling means further comprises a plurality of said cable restraint member looped through openings in said guardrail post.

6. The improved breakaway steel guardrail post of claim 3 wherein said controlling means further comprises a plurality of said cable restraint members looped through openings in said guardrail post.

7. An improved breakaway steel guardrail post for use in dissipation of impact energy upon impact of said post, said post having an upper post member and a lower post member disposed beneath and spaced apart from said upper post member, and a first connecting joint member attached to said upper and lower post members, said breakaway post comprising:

a means connected to said upper post member and said lower post member for controlling said energy dissipation of said post about said connecting joint member at a predetermined rate, said controlling means further comprises a strap member fastened to said upper post member by a first fastener through a first strap opening and to said lower post member by a second fastener through a second strap opening an upper web portion of said upper post member having an upper opening for receiving said first fastener and a lower web portion of said lower post member having a lower opening for receiving said second fastener, said predetermined rate of energy dissipation controlled by the failure strength of said strap, said web, said fastener, the distance of said upper and lower openings from an edge of said web portions, and the distance of said first and second strap openings from edges of said strap;

said strap further comprises a slotted opening to receive said first fastener, said predetermined rate of energy dissipation further controlled by the length of said slotted opening.

8. The improved breakaway steel guardrail post of claim 7 wherein said controlling means comprises a plurality of said straps having said slotted opening to receive a plurality of said first fasteners.

9. The improved breakaway steel guardrail post of claim 7 wherein said strap further comprises a second slotted opening to receive said second fastener, said predetermined rate of energy dissipation further controlled by the length of said first and said second slotted opening.

10. The improved breakaway steel guardrail post of claim 9 wherein said controlling means comprises a plurality of said straps having said first and second slotted openings to receive a plurality of said first and said second fasteners, respectively.

11. An improved breakaway steel guardrail post for use in dissipation of impact energy upon impact of said post, said post having an upper post member and a lower post member disposed beneath and spaced apart from said upper post member, and a first connecting joint member attached to said upper and lower post members, said breakaway post comprising:

a means connected to said upper post member and said lower post member for controlling said energy dissipation of said post about said connecting joint member at a predetermined rate, said controlling means further comprises a strap member fastened to said upper post member by a first fastener through a first opening and to said lower post member by a second fastener through a second strap opening, said first opening slotted to receive said first fastener, said predetermined rate of energy dissipation controlled by the length of said first slotted opening.

12. The improved breakaway steel guardrail post of claim 11 wherein said second strap opening is slotted to receive said second fastener, said predetermined rate of energy dissipation further controlled by the length of said second slotted opening.

* * * * *